Jan. 15, 1929.  L. W. EGGLESTON  1,699,513
REFRIGERATING APPARATUS
Filed April 30, 1926   5 Sheets-Sheet 1
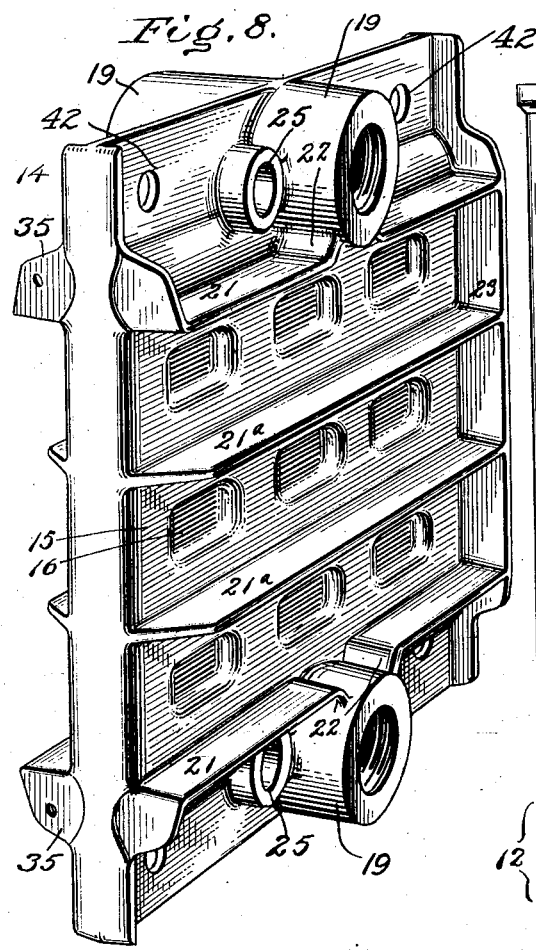
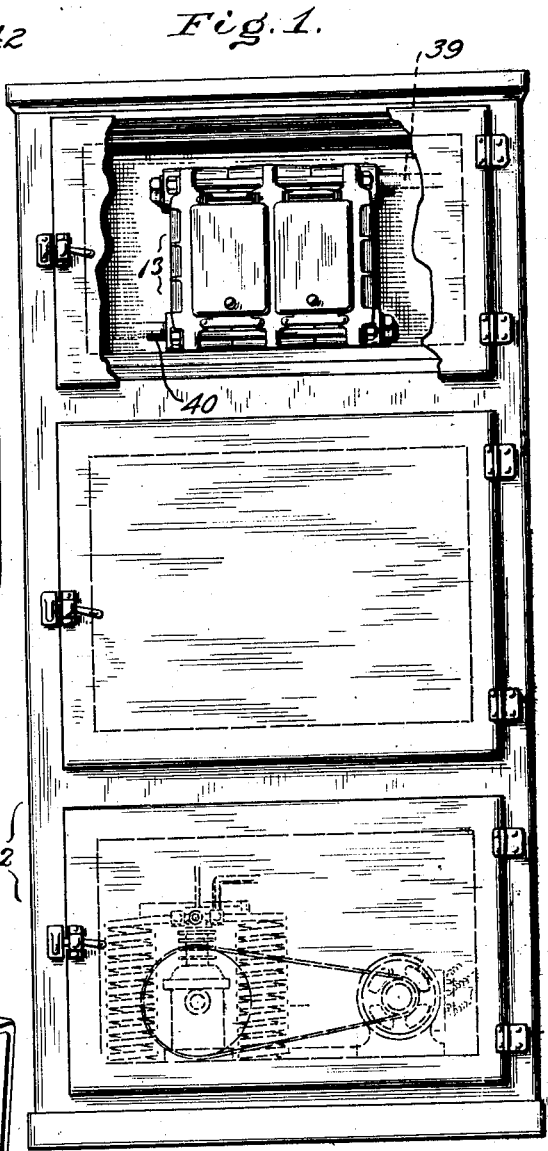
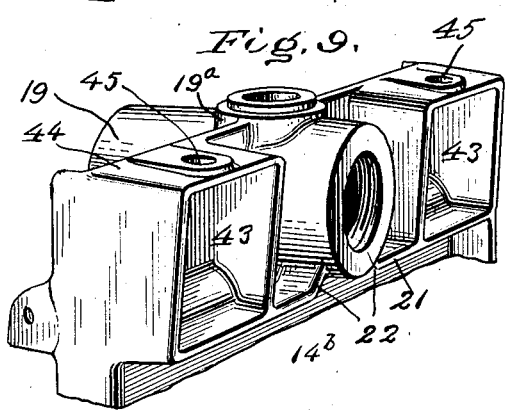
INVENTOR
Lewis W. Eggleston
BY Conrad A. Dieterich
his ATTORNEY Jan. 15, 1929.                L. W. EGGLESTON                1,699,513
                          REFRIGERATING APPARATUS
                          Filed April 30, 1926          5 Sheets-Sheet 2
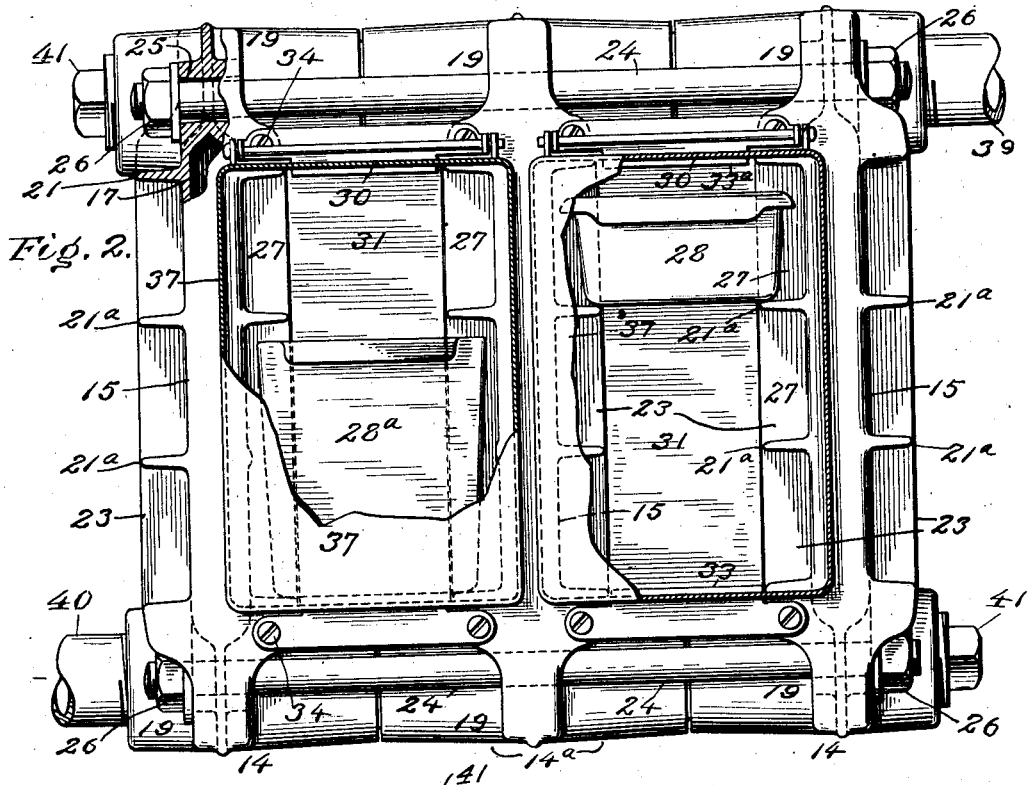
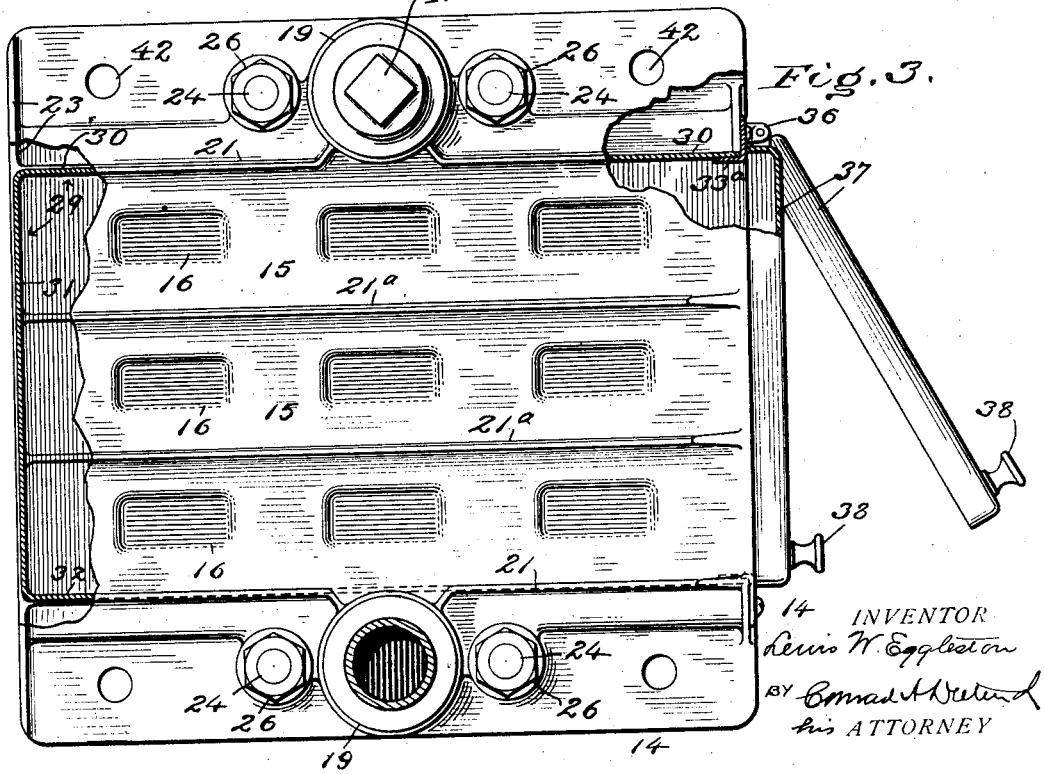
INVENTOR
Lewis W. Eggleston
BY Conrad A. Dieterich
his ATTORNEY

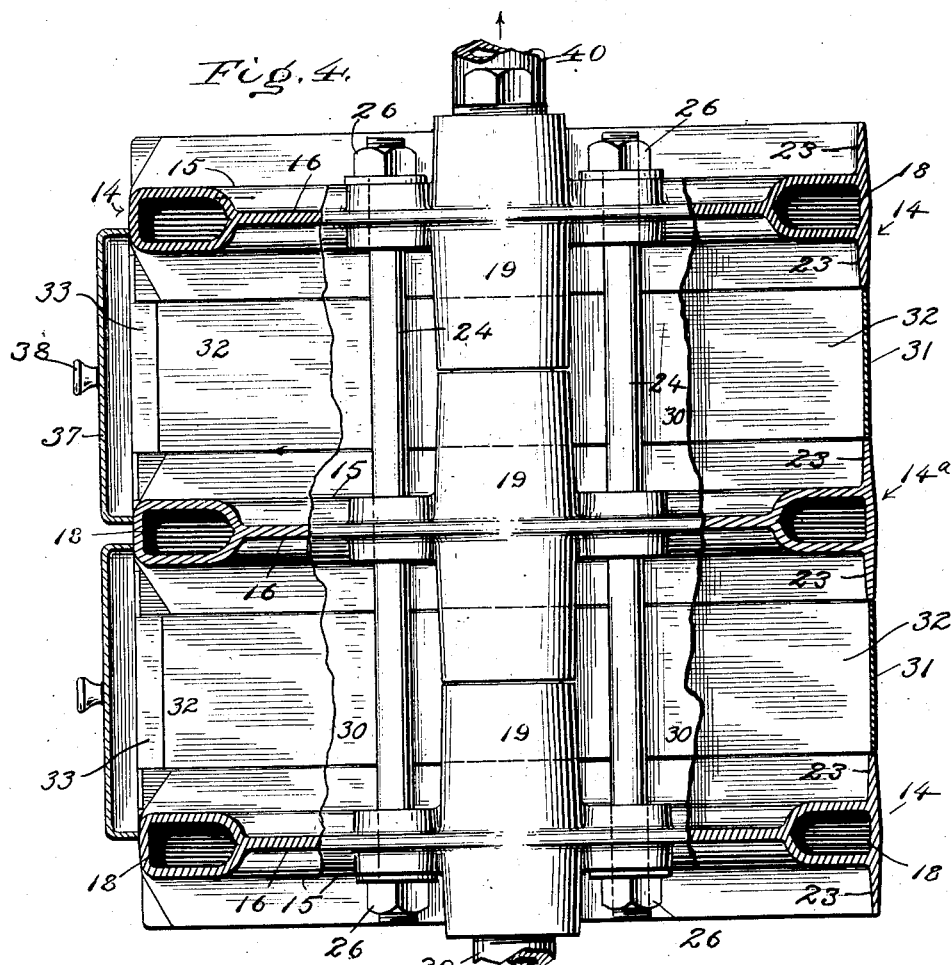
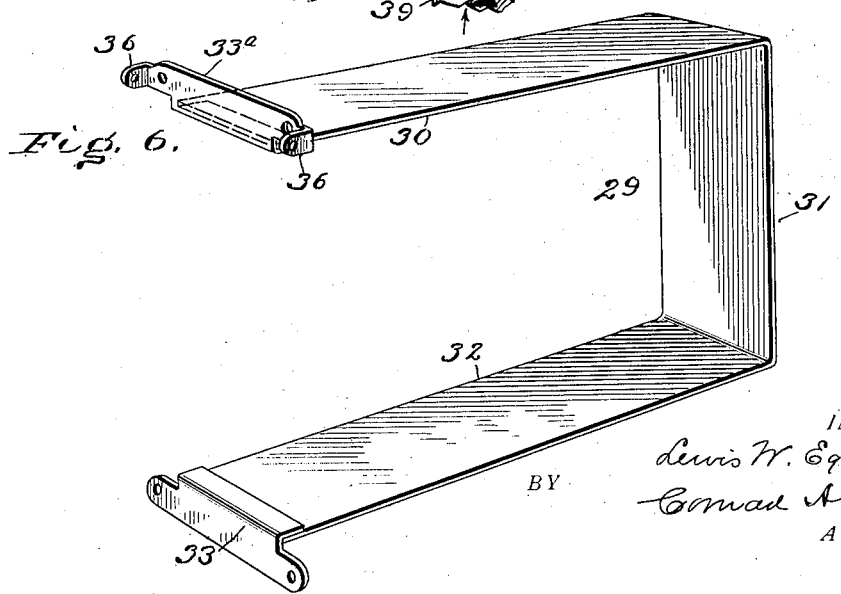

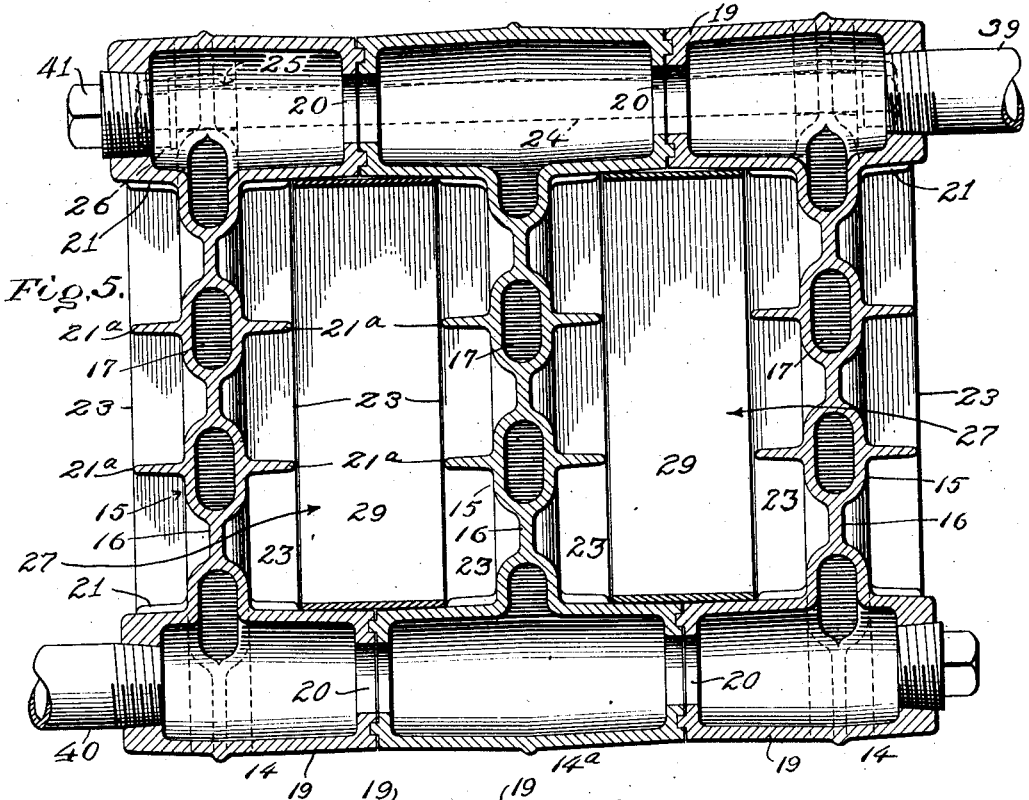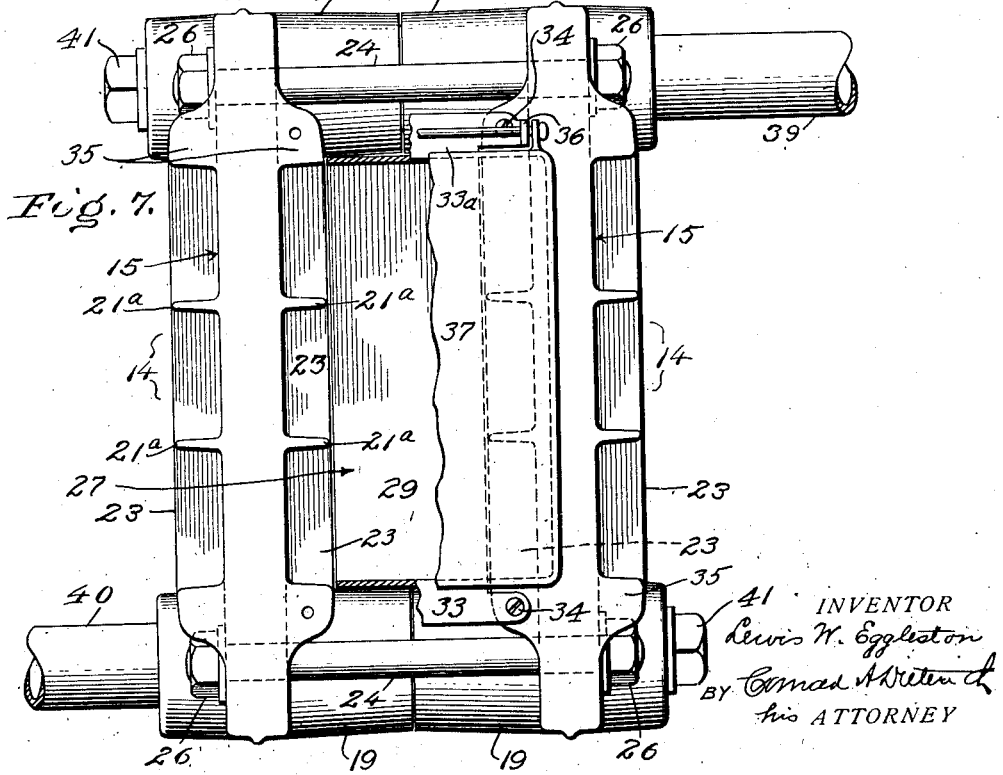

Jan. 15, 1929.
L. W. EGGLESTON
1,699,513
REFRIGERATING APPARATUS
Filed April 30, 1926      5 Sheets-Sheet 5
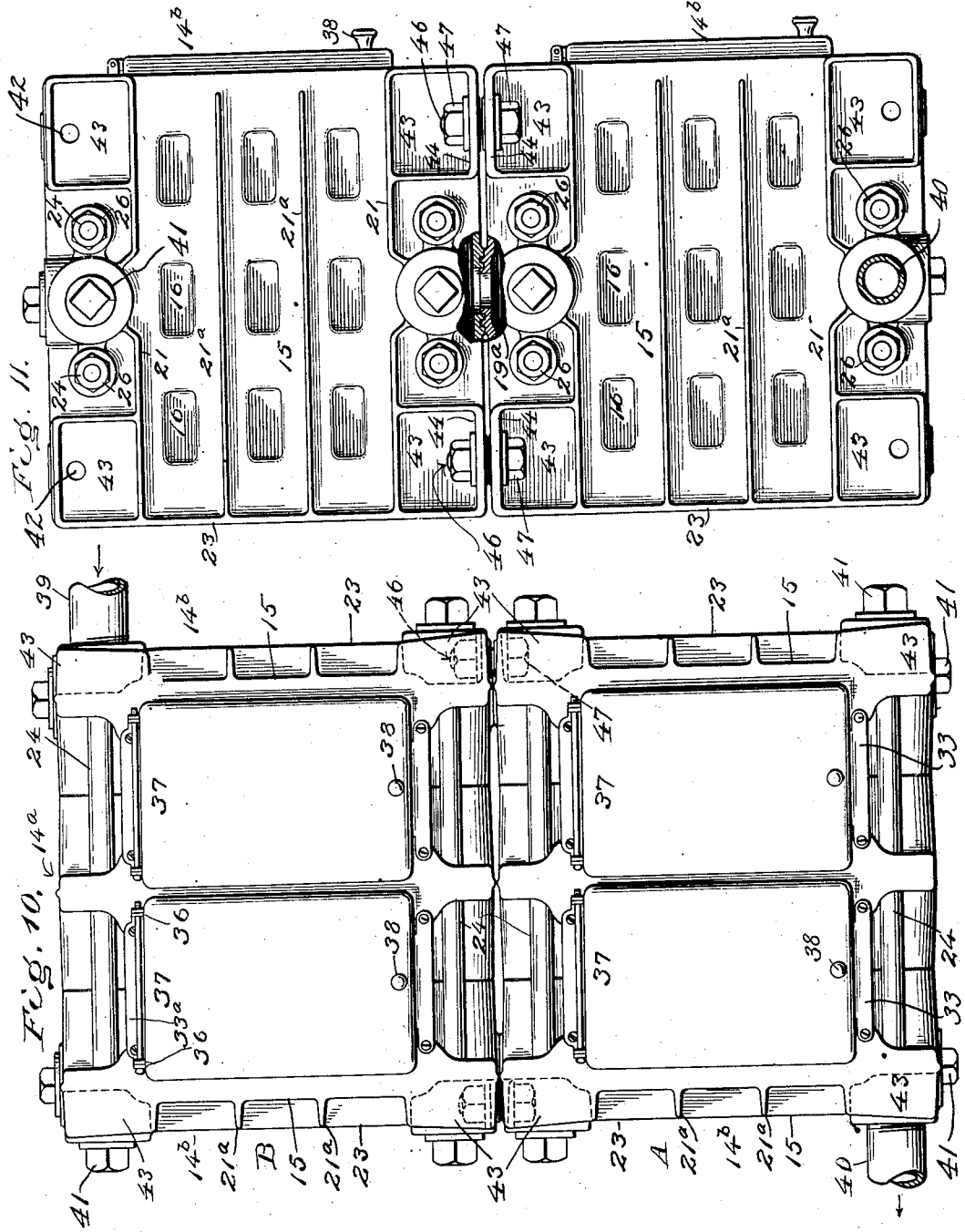
INVENTOR
Lewis W. Eggleston
BY Conrad A. Dieterich
his ATTORNEY Patented Jan. 15, 1929.

1,699,513

UNITED STATES PATENT OFFICE.

LEWIS W. EGGLESTON, OF BUFFALO, NEW YORK, ASSIGNOR TO AMERICAN RADIATOR COMPANY, OF NEW YORK, N. Y., A CORPORATION OF NEW JERSEY.

REFRIGERATING APPARATUS.

Application filed April 30, 1926. Serial No. 105,671.

My invention relates to means for cooling refrigerators or the like; and the same has for its object more particularly to provide a simple, reliable and efficient apparatus which is compact, inexpensive to produce, and economical in operation.

Further, said invention has for its object to provide an apparatus of the character specified in which the cooling surfaces thereof are disposed to permit of the production of the maximum amount possible, within the space enclosed by said apparatus, of ice, frozen confections, or other objects.

Further, said invention has for its object to provide an apparatus of the character specified which is capable of being indefinitely expanded, within practical limits, to produce a unit of any desired capacity or size.

Further, said invention has for its object to provide an apparatus of the character specified which consists of integrally cast assembled sections adapted to vary in number according to the capacity of the refrigerator in which the same is to be used, or according to the extent of cooling surface required.

Further, said invention has for its object to provide an apparatus of the character specified in which the walls thereof, constituting the cooling surfaces, serve to support the articles or substances to be cooled or frozen, or the receptacles containing the same, in direct contact therewith.

Further, said invention has for its object to provide an apparatus of the character specified in which the assembled sections are maintained in spaced relation to provide a chamber or chambers between the same of ample width to receive the articles or substances to be cooled or frozen.

Further, said invention has for its object to provide an apparatus of the character specified in which the space or cooling chamber formed by the walls thereof constituting the cooling surfaces are enclosed to prevent the circulation of air therethrough during the cooling or freezing operation.

Further, said invention has for its object to provide an apparatus of the character specified in which the assembled sections thereof are maintained in spaced relation to form between the same a space or chamber for receiving the article or substances to be cooled, or the receptacles containing the same, and in which the opposing wall portions of said sections are formed with extended cooling surfaces serving to support said articles or said receptacles in direct contact therewith.

Further, said invention has for its object to provide an apparatus of the character specified which includes a series of separate sections assembled in spaced relation to form between the same a space or chamber for receiving the articles or substances to be cooled or frozen, or the containers therefor, and a member interposed between said sections to enclose said chamber or space.

Other objects and advantages will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings forming part of this specification—

Fig. 1 is a front elevation of a power operated refrigerator having applied thereto one form of refrigerating apparatus constructed according to and embodying my said invention;

Fig. 2 is an enlarged front elevation of said refrigerating apparatus with parts broken away, and partly in section;

Fig. 3 is a side elevation thereof with parts broken away, and partly in section;

Fig. 4 is a plan thereof with parts broken away;

Fig. 5 is a central vertical section thereof;

Fig. 6 is a perspective of an enclosing member;

Fig. 7 is a front elevation with parts broken away showing an assembly consisting of two sections;

Fig. 8 is a perspective of one of the side or end sections;

Fig. 9 is a perspective of the upper portion of a modified form of section adapted to permit of the assembly of the sections in tiers;

Fig. 10 is a front elevation of a system in which the sections are arranged in tiers; and Fig. 11 is a side elevation thereof.

Referring to the drawings, my invention is shown for the purposes of illustrating one application thereof applied to a power operated refrigerating system 12 intended for domestic use (Fig. 1). In such systems the contents of the refrigerator are maintained cool or are frozen by circulating a fluid therethrough, such cooling agents or medium replacing the ice usually employed.

In my invention the fluid receiving means or refrigerating element 13 consists of a plurality of sections or members 14, 14ª, which are, preferably, formed in one piece, or integrally cast.

Each section or member 14, 14ª (see Fig. 8) includes a hollow body portion 15 having horizontal rows of constricted portions 16 therein forming horizontal and vertical passages 17 and 18 within the body portion 15 through which the cooling agent or medium circulates. Hub portions 19 project centrally from the opposite sides of said body portion 15 at the top and bottom thereof, and said hub portions are provided with openings 29 therethrough in communication with the interior of the body portion 15. Horizontal flanges or ribs 21 project laterally from the opposite sides of said body portion 15 near the hub portions 19, said flanges 21 merging at the inner ends thereof with said hub portion 19, as indicated at 22. Each section 14, 14ª, (see Fig. 8) is provided with horizontal flanges 21ª projecting laterally from the opposite sides thereof and located between the flanges 21 and between the hubs 19. The flanges 21, 21ª provide means serving, in cooperation with the similar flanges 21 or 21ª on the adjacent section, to directly support the article to be cooled or frozen, and provide extended cooling surfaces.

Vertical flanges 23 project laterally from the rear edges of the body portion 15 and extend transversely of the flanges 21 and 21ª, the edges of the flanges 21, 21ª and 23 at each side of the member 15 lying substantially in the same plane. The hub portions 19 project outwardly beyond the edges of said flanges.

The hollow sections 14, 14ª, as shown at Figs. 2 to 5, may be assembled in any desired number to form a refrigerating element or cooling means of the desired size or capacity.

At Figs. 2 to 5, I have illustrated, as one example, an assembly including the end or side sections 14 and an intermediate section 14ª, the intermediate section 14ª differing in construction from section 14 in having relatively long hub or nipple portions 19 of substantially equal length projecting from the opposite sides thereof.

When the members or sections 14, 14ª, are assembled, as shown, with the opposing hub portions 19 registering with each other, the same are retained in fluid tight relation by means of the tie rods 24 extending through the openings 25 at the top and bottom of each section 14, 14ª, at opposite sides of the upper and lower hub portions 19 and secured by the nuts, or devices 26.

The engaging or registering hub portions 19, which portions 19 project a substantial distance beyond the edges of the flanges 21, 21ª, maintain said sections 14, 14ª in spaced relation to form chambers 27 therebetween of sufficient size to receive the article or substances to be cooled, such as the trays 28 containing liquids to be frozen, the corresponding flanges 21, 21ª, serving to support said trays, or other objects, in position between the sections 14, 14ª. As shown at Fig. 2, if so desired, certain of the flanges 21ª may be omitted to permit of the reception between the sections of a deeper tray 28ª.

Each chamber 27 is enclosed at the top, bottom and rear by a U-shaped member or strip 29 comprising an upper portion 30, a rear portion 31, and a bottom portion 32. Secured to the ends of said member 29 are angular brackets 33, 33ª whereby the member 29 is secured in position between the sections 14, 14ª.

The portions 30, 32, of the enclosing member 29 fit between and register with the corresponding opposing upper and lower flanges or ribs 21 with the contiguous edges of said portions and flanges substantially engaging. The rear portion 31 of said member 29 fits between and registers with the opposing vertical flanges 23, with the contiguous edges substantially engaging.

The member 29 is secured to the sections 14, 14ª at the front thereof by means of suitable devices, such as the bolts or screws 34, passing through said angular brackets 33, 33ª into the flange portions 35 of the sections 14, 14ª.

Each upper bracket 33ª is provided with forwardly directed lugs or hinge leaves 36 on which a door or closure 37 is pivoted or hinged at its upper end so that the same will be maintained normally in closed position by gravity. The door 37 may be readily raised or opened by means of the knob or finger piece 38 secured to the lower end thereof.

The cooling medium enters the system through the flow pipe 39 and passes out through the return pipe 40, or vice versa. The openings in the remaining outer hub portions 19 are normally closed by means of suitable plugs or closures 41. The openings 42 are for the purpose of receiving hooks, or similar devices for suspending the assembled sections by chains or cords from the ceiling of the cooling room or top of the refrigerator, if so desired.

At Fig. 7 is illustrated an assembly or system of smaller capacity than that shown at Figs. 1 to 5, which consists of two side sections 14 only communicatively secured in spaced relation as above described. In like manner, systems of any desired capacity may be obtained by using two of such side sections 14 and the desired number of intermediate sections 14ª.

At Fig. 9, is illustrated a modified form of side or end sections 14<sup>b</sup> adapted for use in assembling the sections in superimposed series or in tiers A and B, as shown at Figs. 10 and 11.

The side sections 14<sup>b</sup> differ from the sections 14 in having vertical hub portions 19<sup>a</sup> thereon at their tops and bottoms formed integrally with and projecting from the hub portions 19, and provided with openings therethrough to permit of communication with interior of the sections. At opposite sides of each outer horizontal hub portion 19 above and below the flange portions 21 are formed angular portions or pockets 43 having horizontal portions 44 provided with openings 45 therein. The sections 14<sup>b</sup>, 14<sup>a</sup> of the lower series or tiers A, in any desired number, are assembled with the opposing hub portions 19 registering as described above, and the same are then secured in fluid tight relation by means of the tie rods 24 and nuts 26. The series or tier B similarly assembled is then placed in position upon the tier A with the corresponding opposing hub portions 19<sup>a</sup> registering with each other. The several tiers A and B are then secured with the engaging hub portions 19<sup>a</sup> in fluid tight relation by means of bolts 46 extending through the opening 45 of the pockets 43 and secured by the nuts 47. The cooling medium is supplied to the system through the pipe 39 connected to one of the outer upper hub portions 19 of the upper tier B, and passes out through the pipe 40 connected to the lower outer hub portion 19 of the tier A at the opposite end of the system. The remaining outer hub portions 19, 19<sup>a</sup> are closed by suitable plugs or closures 41. The system shown at Figs. 10 and 11 is in other respects constructed and arranged like the system illustrated at Figs. 1 to 5.

In operation, the several sections 14, 14<sup>a</sup> (or 14<sup>b</sup>) are assembled as above described, to form a single tier or a plurality of tiers, according to the capacity or arrangement desired. The assembled sections are then disposed in the cooling room or refrigerator, directly upon the floor or base thereof, or suspended from the ceiling or top thereof, as desired. The assembled sections are supplied with the cooling medium, such as an expansible gas, or a pre-cooled brine solution or other liquid, through the pipe 39, the cooling medium passing out through the pipe 40.

The assembled sections 14, 14<sup>a</sup>, 14<sup>b</sup>, together with the U-shaped members 29 provide a receptacle for receiving articles or substances to be cooled or frozen. For forming ice, frozen confections or the like, the trays 28, 28<sup>a</sup>, with the substances to be frozen therein are received within the several receptacles formed by said sections and are supported upon the flanges 21, 21<sup>a</sup> in direct contact with the cooling surfaces. The door or doors 37 are maintained closed during the freezing operation to prevent the circulation of air within the chamber or chambers.

My said invention provides a construction which is capable of indefinite expansion, within practical limits, to provide economically a cooling system or element of any desired capacity or size.

Further, the series of sections are maintained amply spaced to provide a chamber or chambers between the same for receiving the articles or substances to be cooled or frozen, or the containers therefor, which chambers or spaces are completely enclosed.

Having thus described my said invention, what I claim and desire to secure by Letters Patent is:

1. An apparatus of the character specified comprising a plurality of hollow sections arranged in spaced relation to provide a chamber therebetween, and communicatively connected to permit of the circulation of a cooling medium therethrough, means cooperating with said sections for enclosing the space therebetween, and means on said sections for supporting a substance to be cooled, substantially as specified.

2. An apparatus of the character specified comprising a plurality of hollow sections communicatively connected to permit of the circulation of a cooling medium therethrough, and means projecting from the opposing walls of said sections cooperating with each other for supporting between said sections an object to be cooled, substantially as specified.

3. An apparatus of the character specified comprising a plurality of integrally-cast hollow sections, means projecting therefrom forming extended cooling surfaces and serving to support an object in position between said sections, means cooperating with said sections for enclosing the space therebetween, and means communicatively connecting said sections to permit of the circulation of a cooling medium therethrough, substantially as specified.

4. An apparatus of the character specified comprising a plurality of hollow sections, means for securing said sections in spaced relation to provide a chamber therebetween for the reception of an object to be cooled, and means cooperating with said sections for enclosing the space therebetween, substantially as specified.

5. An apparatus of the character specified comprising a plurality of hollow sections communicatively connected in series to permit of the circulation of a cooling medium therethrough, and maintained in spaced relation to provide a chamber therebetween, and means projecting from the inner walls of said chamber for supporting therein an object to be cooled, substantially as specified.

6. An integrally-cast section comprising a hollow body portion adapted to receive a cooling medium, supporting members projecting laterally from said body portion, and hub portions thereon above and below said supporting members, and projecting laterally from said body portion beyond said supporting members, substantially as specified.

7. An integrally-cast section comprising a hollow body portion adapted to receive a cooling medium, horizontal flanges projecting laterally from said body portion, a vertical flange projecting laterally from said body portion at the rear edge thereof, and hub portions above and below said horizontal flanges arranged centrally of said body portion, and projecting laterally therefrom beyond said horizontal flanges, substantially as specified.

8. An apparatus of the character specified comprising a plurality of hollow sections maintained in spaced relation, and adapted to receive a circulating cooling medium, and a separate member disposed between and secured to said sections and cooperating therewith for enclosing the space therebetween, substantially as specified.

9. An apparatus of the character specified comprising a plurality of hollow sections maintained in spaced relation, and communicatively connected for the circulation of a fluid therethrough, flanges projecting from the opposing wall portions of said sections, and a member disposed between said sections and registering with certain of said flanges and cooperating with said sections to enclose the space between said sections, substantially as specified.

10. An apparatus of the character specified comprising a plurality of hollow sections maintained in spaced relation, and communicatively connected for the circulation of a fluid therethrough, and a member disposed between said sections and enclosing the space therebetween at the top, bottom and rear thereof, substantially as specified.

11. An apparatus of the character specified comprising a plurality of hollow sections maintained in spaced relation, and communicatively connected for the circulation of a fluid therethrough, a member disposed between and secured to said sections and forming therewith a receptacle, and a closure for said receptacle, substantially as specified.

12. An apparatus of the character specified comprising a plurality of sections having registering hub portions at opposite ends thereof serving to maintain said sections in spaced relation, and communicatively connecting the same, and a member disposed between said sections intermediate said hub portions, and cooperating with said sections to enclose the space between said sections, substantially as specified.

13. An apparatus of the character specified comprising a plurality of sections having registering hub portions serving to maintain said sections in spaced relation, and communicatively connecting the same, flanges projecting from the opposing wall portions of said sections between said hub portions, and a member disposed between said sections and registering with said flanges and cooperating with said sections to enclose the space between said sections intermediate said hub portions, substantially as specified.

14. An apparatus of the character specified comprising a plurality of sections maintained in spaced relation and communicatively connected, registering series of horizontal flanges projecting from the opposing wall portions of said sections, registering vertical flanges projecting from said opposing wall portions at the rear thereof, and a U-shaped member disposed between said sections, and registering with certain of said horizontal flanges and with said vertical flanges to form with said sections a receptacle for receiving the objects to be cooled, substantially as specified.

15. An apparatus of the character specified comprising a plurality of integrally-cast sections including registering hub portions disposed centrally of the upper and lower portions thereof, and serving to maintain said sections in spaced relation and in communication, means at opposite sides of said hub portions for securing said sections together, series of registering horizontal flanges projecting from the opposing wall portions of said sections, and registering vertical flanges projecting from said opposing wall portions at the rear thereof; said flanges providing extended cooling surfaces, and certain thereof serving as supports for the objects to be received between said sections, a U-shaped member disposed between said sections intermediate said hub portions and said securing means, and registering with the upper and lower opposing horizontal flanges and with the opposing vertical flanges to form with said sections a receptacle, means for securing said member at the forward ends thereof to said sections, and a closure for said receptacle pivotally secured adjacent to the open end of said U-shaped member, substantially as specified.

16. An apparatus of the character specified, comprising a plurality of sections constituting wall members having fluid passages therein, means communicatively connecting said sections to permit of the circulation of a cooling medium therethrough, and registering means projecting from opposing walls of said sections for supporting between said sections an object to be cooled, substantially as specified.

17. An apparatus of the character specified, comprising a receptacle including a plurality of conforming sections communicatively connected to permit of the circulation of a cooling medium therethrough; said sections constituting two opposing walls of said receptacle, and registering means projecting inwardly from said opposing walls and jointly forming a series of shelves between said sections for severally receiving objects to be cooled, substantially as specified.

18. An apparatus of the character specified, comprising a receptacle including a plurality of sections communicatively connected to permit of the circulation of a cooling medium therethrough; said sections forming two opposing walls thereof, registering members projecting from said walls of said sections serving to support between said sections an object to be cooled, and means at the rear of said receptacle for limiting the inward movement of said object to be cooled, substantially as specified.

19. An apparatus of the character specified, comprising a receptacle including a plurality of sections communicatively connected to permit of the circulation of a cooling medium therethrough; said sections constituting two opposing side walls of said receptacle, and solid registering members projecting inwardly from said opposing walls for supporting thereon an object to be cooled, substantially as specified.

20. An apparatus of the character specified, comprising a receptacle including a plurality of sections, means for communicatively connecting said sections to permit of the circulation of a cooling medium therethrough and for maintaining said sections in spaced relation to each other; said sections constituting two opposing side walls of said receptacle, and registering means projecting inwardly from the opposing walls of said sections for supporting thereon an object to be cooled, substantially as specified.

21. An apparatus of the character specified, comprising a receptacle including a plurality of sections, means for communicatively connecting said sections to permit of the circulation of a cooling medium therethrough and for maintaining said sections in spaced relation to each other; said sections constituting two opposing side walls of said receptacle, and a vertical series of horizontal ribs projecting inwardly from each of the opposing walls of said sections, the ribs of each series registering with the corresponding ribs of the other series, and forming therewith means for supporting thereon an object to be cooled, substantially as specified.

22. In an apparatus of the character specified, a wall element having a passage therein to permit of the circulation of a cooling medium therethrough, and registering ribs projecting horizontally from the opposite sides of said wall element adapted to register with corresponding ribs of contiguous elements for supporting thereon an object to be cooled, substantially as specified.

23. In an apparatus of the character specified, a wall element having a passage therein to permit of the circulation of a cooling medium therethrough, registering ribs projecting horizontally from the opposite sides of said wall element adapted to register with corresponding ribs of contiguous elements for supporting thereon an object to be cooled, and hollow members at opposite portions of said element, adapted to engage with corresponding hollow members of contiguous elements for communicatively connecting said elements and for maintaining the same in spaced relation to each other, substantially as specified.

Signed at the city of New York, in the county and State of New York, this 29th day of April, one thousand nine hundred and twenty-six.

LEWIS W. EGGLESTON.